Feb. 28, 1933.    J. E. HORSTE    1,899,329
MOWER ATTACHMENT FOR ENDLESS TREAD TRACTORS
Filed May 12, 1930    3 Sheets-Sheet 1
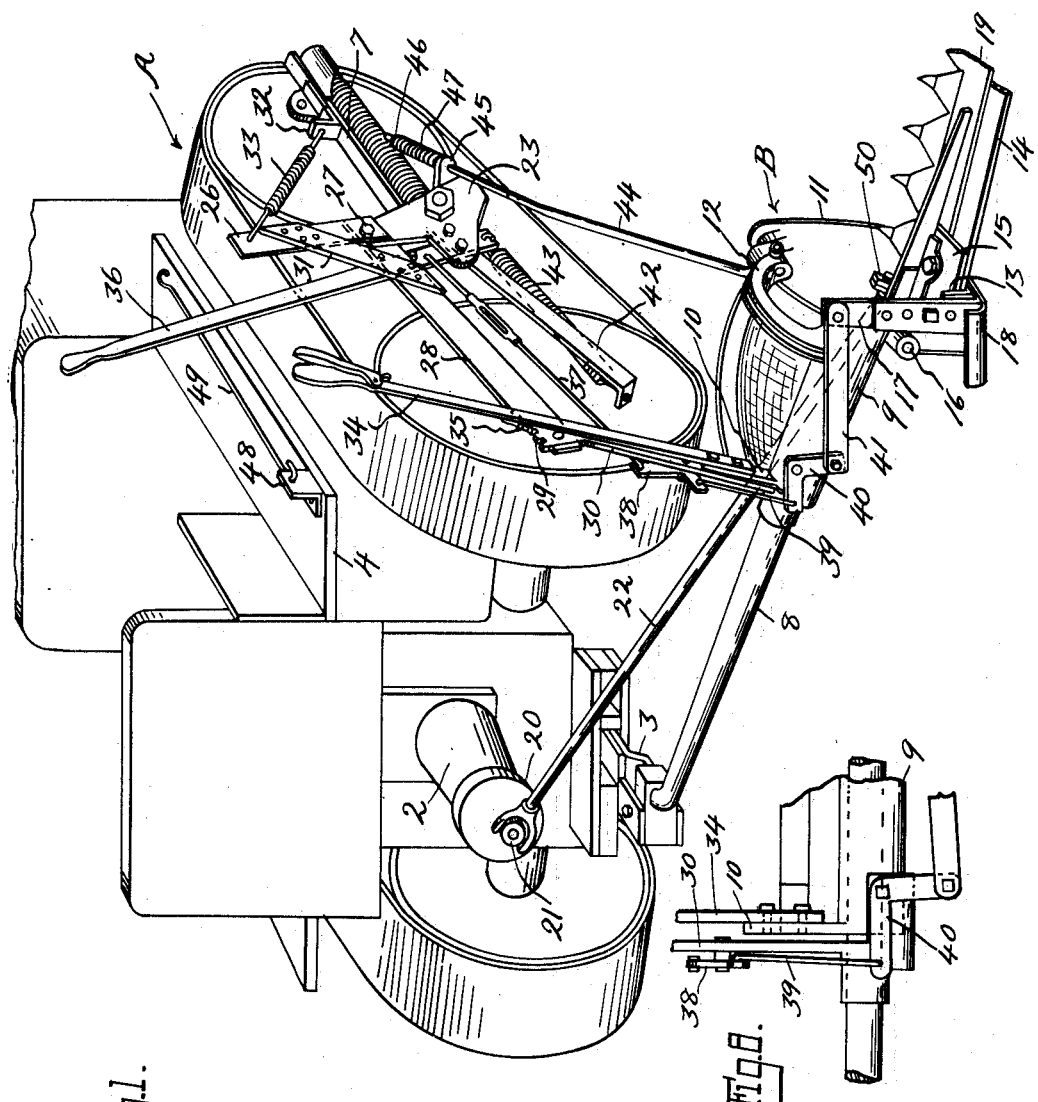
INVENTOR
Joseph E. Horste
BY
Whittemore, Hulbert, Whittemore & Belknap
ATTORNEYS Feb. 28, 1933. J. E. HORSTE 1,899,329
MOWER ATTACHMENT FOR ENDLESS TREAD TRACTORS
Filed May 12, 1930 3 Sheets-Sheet 2
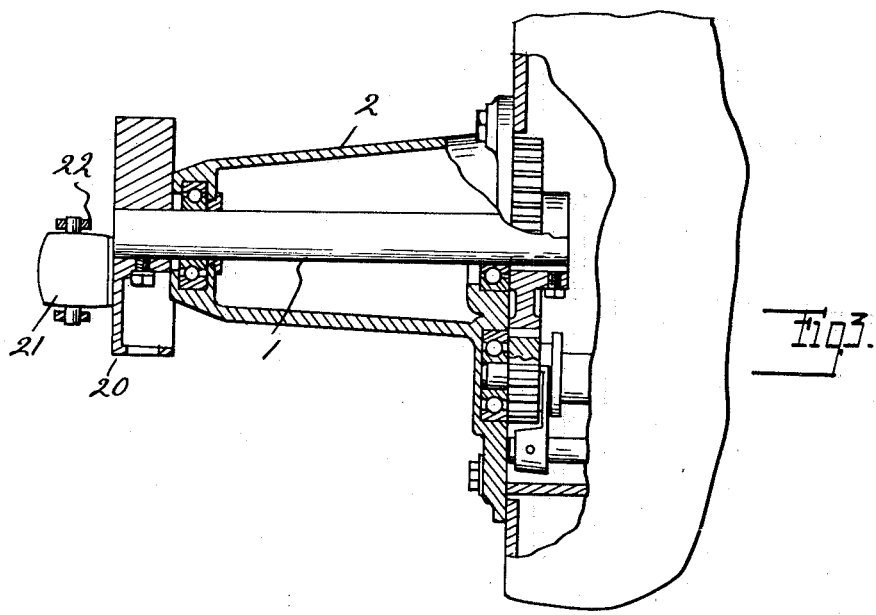
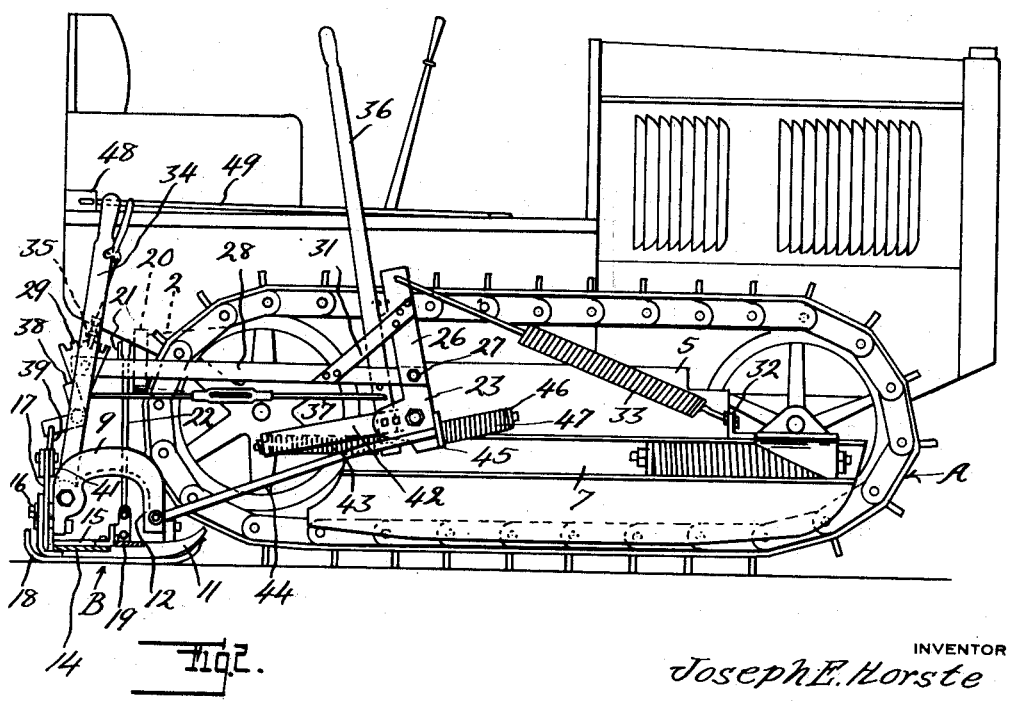
INVENTOR
Joseph E. Horste

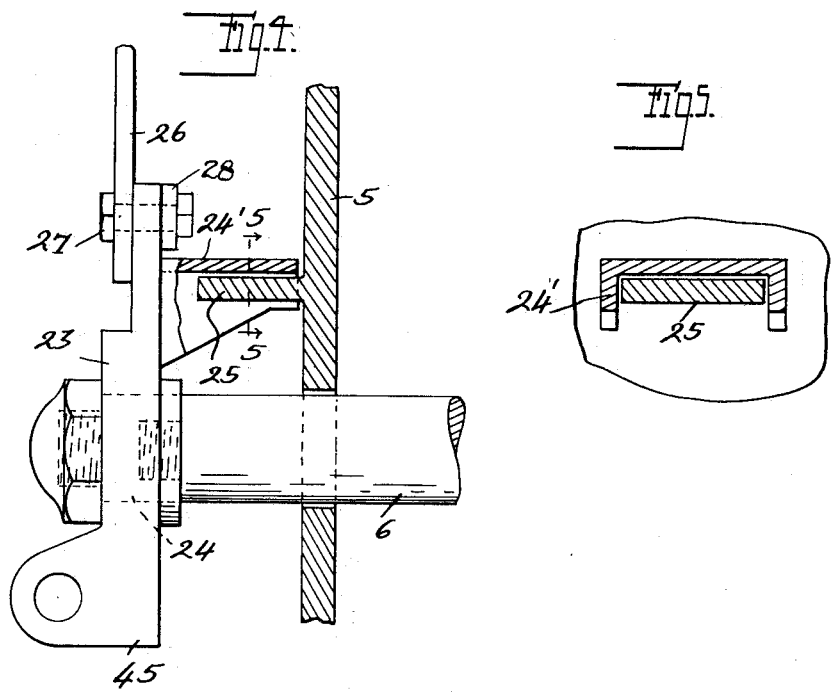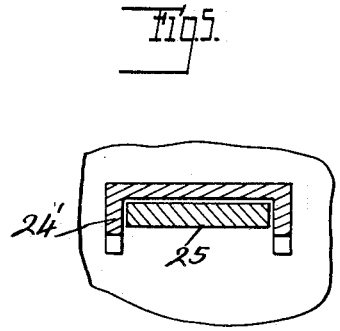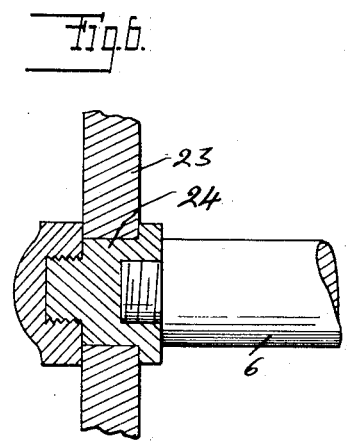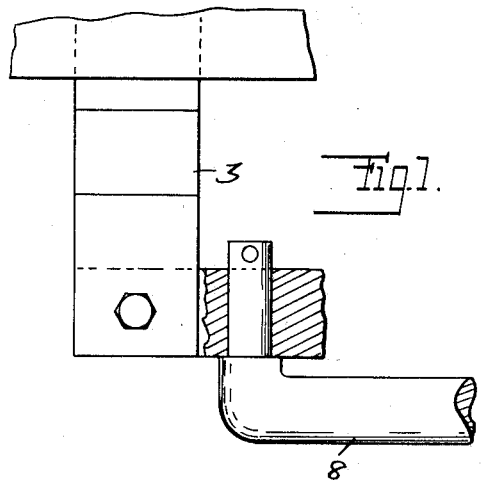

Patented Feb. 28, 1933

1,899,329

UNITED STATES PATENT OFFICE

JOSEPH E. HORSTE, OF DETROIT, MICHIGAN, ASSIGNOR TO DETROIT HARVESTER COMPANY, OF DETROIT, MICHIGAN, A CORPORATION OF MICHIGAN

MOWER ATTACHMENT FOR ENDLESS TREAD TRACTORS

Application filed May 12, 1930. Serial No. 451,780.

This invention relates generally to tractor attachments and comprises a mower attachment for a tractor of the endless tread type.

One of the essential objects of the invention is to provide an attachment of this type that may be readily attached to an endless tread tractor and is capable of being driven from a power take-off at the rear thereof.

Another object is to provide an attachment in which the ground engaging elements thereof are bodily movable relative to the tractor so that regardless of the swaying movements of the tractor such elements may remain on the ground at all times while in use.

With the above and other objects in view the invention consists of certain novel features of construction, combinations and arrangements of parts that will be hereinafter more fully described and particularly pointed out in the appended claims.

In the acocmpanying drawings:

Figure 1 is a perspective view of a tractor with an attachment embodying my invention applied thereto and showing a portion of the mower bar and associated elements broken away;

Figure 2 is a side elevation of the construction illustrated in Figure 1 and showing a portion of the mower bar in section;

Figure 3 is a fragmentary sectional view of the rear end of the tractor and showing the connections between the pitman and the power take-off thereof;

Figure 4 is a fragmentary vertical sectional view through the tractor shield and showing the bracket of my attachment applied to the stationary equalizing shaft;

Figure 5 is a sectional view taken on the line 5—5 of Figure 4;

Figure 6 is an enlarged fragmentary vertical sectional view through the bracket at the outer end of the equalizing shaft;

Figure 7 is an enlarged fragmentary sectional view through the drawbar shaft universal connection.

Figure 8 is a fragmentary side elevation of the attachment.

Referring now to the drawings, A is a tractor of the endless tread type and B is a mower attachment therefor embodying my invention. As shown, the tractor is of conventional form and has a power take-off shaft 1, a tubular housing 2 for the shaft, and a drawbar 3 at its rear end, and has a horizontal shelf 4, a vertical shield 5, a laterally projecting stationary equalizing shaft 6 and a longitudinally extending horizontal rail 7 at one side thereof.

The attachment B preferably comprises a shaft 8 having a universal connection with the drawbar 3, a casting 9 of inverted channel formation rockably mounted on the shaft 8 at the outer end thereof and provided at its inner end with an upwardly extending arm portion 10, a ground engaging shoe 11 pivotally connected to the forward wall 12 of the casting and provided at its rear end with an upstanding portion 13, a mower bar 14 projecting laterally outwardly from the shoe 11, a bracket 15 rigid with the bar 14 at the inner end therof, pivoted on a bolt 16 extending transversely of the portion 13 of the shoe and having an upstanding arm 17. 18 is a ground engaging element adjustably connected to the arm 17, and 19 is a reciprocating knife on the mower bar 14. 20 is a counter balanced flywheel keyed upon the power take-off shaft 1 and provided upon its outer face with an eccentric 21, and 22 is a pitman rod terminally connected to the eccentric 21 and knife 19. 23 is a bracket mounted on an extension 24 of the equalizing shaft 6 and having a laterally projecting inverted substantially channel shaped portion 24' receiving a laterally extending lug 25 of the shield 5. 26 is a vertical arm pivoted on a bolt 27 carried by the bracket 23; 28 is a horizontal arm pivoted on the bolt 27; and 29 is a gear segment connected to the arm 28 at the rear end thereof and having a depending arm 30 rockably mounted on the shaft 8. 31 is a brace rigid with the arms 26 and 28; 32 is a bracket rigid with the side rail 7 of the tractor frame; and 33 is a coil spring terminally connected to the bracket 32 and arm 26. 34 is a lever rigid with the arm 10 of the casting and provided with a latch 35 that engages the segment 29 whereby the casting 9, shoe 11 and bar 14 may be rocked as a unit to position the forward edge of the bar 14 and knife 19 upwardly or downwardly relative to the ground. 36 is a lever pivotally connected to the bracket 23 and connected by a series of links and levers 37, 38, 39, 40 and 41 respectively to the arm 17 of the bracket 15 rigid with the mower bar 14 whereby the latter may be raised or lowered by the lever; 42 is a bar rigid with and projecting rearwardly from the bracket 23; and 43 is a spring terminally connected to the lever 36 and rear end of the arm 42. 44 is a rod connected to the forward wall 12 of the casting and extends through an ear 45 of the bracket 23; 46 is a nut on the rod 44 at the forward end thereof in advance of the bracket 45; and 47 is a coil spring on the rod 44 between the nut 46 and ear 45. 48 is a bracket rigid with the shelf 4, and 49 is a rod connected to the bracket 48 and adapted to engage the mower bar 14 when it is raised to hold the same in such raised position.

Thus from the foregoing description it will be apparent that rotation of the shaft 1 causes the eccentric 21 to reciprocate the pitman 22 and knife 19. Inasmuch as the shaft 8 has a universal connection between the draw-bar 3, and the bar 28 has a pivotal connection 27 with the bracket 23, the ground engaging elements of the attachment such as the shoe 11, element 18, and outer shoe assembly (not shown) of the cutter bar 14 are of the full floating type and will remain on the ground regardless of the tilting or swaying of the tractor. In this connection it will be noted that there is a universal connection 50 between the pitman 22 and knife 19 so that the latter may be operated when the supporting bar 14 is disposed at various angles relative to the shoe 11. Adjustment of the lever 34 controls the tilting position of the cutter bar 14 and knife 19 carried thereby, and the lever 36 may be adjusted to raise or lower the cutter bar 14 about its pivot 16. In this connection it will be noted that the springs 43 normally hold the lever 36 in its forward upright position, while the springs 33 and 47 respectively serve as tension and compression elements for the mower assembly.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. A mowing machine attachment for a tractor having a drawbar at the rear end thereof, a shield at one side provided with a laterally projecting lug, and an equalizing shaft extending through the shield, including an extension for the shaft, a bracket mounted on the extension and having a flange attachable to the lug of the shield, a mower bar, a connection between said mower bar and bracket, and means also connected to the mower bar and attachable to the drawbar of the tractor.

2. A mowing machine attachment for a tractor having a shield at one side provided with a laterally projecting lug, and an equalizing shaft extending through the shield, including an extension for the shaft, a bracket mounted on the extension and having a flange attachable to the lug of the shield, a mower bar, a ground engaging shoe carrying the mower bar, and connections between said bracket and ground engaging shoe and mower bar respectively.

3. A mowing machine attachment for a tractor having a laterally projecting equalizing shaft, including an extension for the shaft, a bracket mounted on the extension, a mower bar, a ground engaging shoe supporting the mower bar, connections between said bracket and mower bar and ground engaging shoe, and a support for the ground engaging shoe attachable to another part of the tractor.

4. A mowing machine attachment for a tractor having an equalizing shaft extending laterally therefrom, including an extension for the shaft, a bracket mounted on the extension, a mower bar, a ground engaging shoe supporting the mower bar, a support for the ground engaging shoe attachable to another part of the tractor, a connection between the bracket and ground engaging shoe operable to tilt the mower bar, and a connection between said bracket and mower bar operable to raise and lower said bar.

In testimony whereof I affix my signature.

JOSEPH E. HORSTE.